(12) United States Patent
Yasukawa et al.

(10) Patent No.: US 10,110,060 B2
(45) Date of Patent: Oct. 23, 2018

(54) SEMICONDUCTOR DEVICE

(71) Applicant: RENESAS ELECTRONICS CORPORATION, Tokyo (JP)

(72) Inventors: Tomoki Yasukawa, Tokyo (JP); Akira Oizumi, Tokyo (JP); Toyohiko Yoshida, Tokyo (JP); Yoshinori Tokioka, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/702,354

(22) Filed: Sep. 12, 2017

(65) Prior Publication Data
US 2018/0006491 A1 Jan. 4, 2018

Related U.S. Application Data

(63) Continuation of application No. 14/843,823, filed on Sep. 2, 2015, now Pat. No. 9,787,135.

(30) Foreign Application Priority Data

Sep. 3, 2014 (JP) .................................. 2014-178876

(51) Int. Cl.
*H02J 9/06* (2006.01)
*H02J 1/10* (2006.01)

(52) U.S. Cl.
CPC ................ *H02J 9/061* (2013.01); *H02J 1/10* (2013.01)

(58) Field of Classification Search
USPC ....................................................... 327/408
See application file for complete search history.

(56) References Cited

U.S. PATENT DOCUMENTS

| 5,157,291 A | 10/1992 | Shimoda |
| 5,272,393 A | 12/1993 | Horiguchi et al. |
| 5,886,561 A | 3/1999 | Eitan et al. |
| 6,002,295 A | 12/1999 | Gens et al. |
| 6,359,497 B1 | 3/2002 | Criscione |

(Continued)

FOREIGN PATENT DOCUMENTS

| JP | 2002-181971 A | 6/2002 |
| JP | 2006-195560 A | 7/2006 |

(Continued)

OTHER PUBLICATIONS

Notice of Allowance issued in related U.S. Appl. No. 14/843,823, dated Jun. 12, 2017.

(Continued)

*Primary Examiner* — Jeffrey Zweizig
(74) *Attorney, Agent, or Firm* — McDermott Will & Emery LLP

(57) ABSTRACT

The disclosed invention is intended to prevent malfunction of an internal circuit because of unwanted power supply switching caused by a noise during operation of a semiconductor device powered by a backup power supply, while eliminating wasteful consumption of the backup power supply. A first switching transition time after coupling the main power supply terminal to the internal power supply node until decoupling the backup power supply terminal from the internal power supply node is made longer than a second switching transition time after coupling the backup power supply terminal to the internal power supply node until decoupling the main power supply terminal from the internal power supply node.

6 Claims, 13 Drawing Sheets

(56) References Cited

U.S. PATENT DOCUMENTS 6,642,750 B1    11/2003   Egan
7,298,181 B2    11/2007   Khan et al.
8,183,715 B2     5/2012   Hanawa et al.

FOREIGN PATENT DOCUMENTS

JP       2006178901 A    7/2006
JP      2009-188862 A    8/2009
WO    2010/103603 A1   9/2010

OTHER PUBLICATIONS

Japanese Office Action issued in corresponding Japanese Patent Application No. 2014-178876, dated Jan. 23, 2018, with English Translation.

Japanese Office Action issued in corresponding Japanese Patent Application No. 2014-178876, dated Jun. 19, 2018, with English Translation.

SEMICONDUCTOR DEVICE

CROSS-REFERENCE TO RELATED APPLICATIONS

This application is a continuation of U.S. patent application Ser. No. 14/843,823, filed on Sep. 2, 2015, which claims the benefit of Japanese Patent Application No. 2014-178876 filed on Sep. 3, 2014, the entire contents of each are incorporated herein by reference.

BACKGROUND

The present invention relates to a semiconductor device having two types of power supply terminals, a main power supply terminal which is coupled to a main power supply and a backup power supply terminal which is coupled to a backup power supply. The invention also relates to a technique that is effectively applied to, e.g., a microcontroller including a clock circuit.

Techniques exist that, through the use of a backup power supply in addition to a main power supply, assure a continued operation of an electronic device by using the backup power supply even in case of interruption or loss of the main power supply. For example, Patent Document 1 describes a technique in which, when a main power supply has interrupted or its output voltage has dropped, a power supply switchover unit is actuated to supply power from a backup power supply to a volatile memory and a clock circuit 3. Also, Patent Document 2 describes a technique that, when switching from an oscillation circuit powered by a backup power supply to an oscillation circuit powered by a main power supply to generate a clock which is supplied to a clocking circuit, utilizes a delay circuit to wait until stabilization of oscillation of the oscillation circuit powered by the main power supply. This can avoid the occurrence of a clocking error and malfunction of a clock circuit, when switching from the oscillation circuit powered by the backup power supply to the oscillation circuit powered by the main power supply.

RELATED ART DOCUMENTS

Patent Documents

[Patent Document 1]
Japanese Published Unexamined Patent Application No. 2006-195560
[Patent Document 2]
Japanese Published Unexamined Patent Application No. 2002-181971

SUMMARY

The present inventors examined a risk that, during the use of a backup power supply because of loss of a main power supply, temporary switching of power supply coupling from the backup power supply to the main power supply occurs, attributed to a noise.

In a semiconductor device such as, e.g., a microcontroller having a clock circuit, in particular, a semiconductor device having a backup power supply terminal as well as a main power supply terminal as external terminals for supplying power, a main power supply is coupled to the main power supply terminal and a power supply such as a dual-layer electric capacitor (super-capacitor) or a button battery is coupled to the backup power supply terminal. As long as power is supplied via the backup power supply terminal even incase of interruption of power supply via the main terminal, the operation of a subset of circuits including the clock circuit can be continued. However, after a switchover to the backup power supply, if temporary switching of power supply coupling from the backup power supply to the main power supply occurs, attributed to a noise, then the supply of the power stops instantaneously, which results in malfunction of the clock circuit among others. More specifically, when the voltage of the main power supply has dropped below a predetermined voltage, the main power supply terminal is decoupled from an internal power supply node after the elapse of a given switching transition time after the backup power supply terminal is coupled to the internal power supply node. Conversely, when the voltage of the main power supply has risen above the predetermined voltage, the backup power supply terminal is decoupled from the internal power supply node after the elapse of a given switching transition time after the main power supply terminal is coupled to the internal power supply node. Thereby, it is ensured that supply of power from both power supplies does not interrupt during a power supply switchover. In regard to this point, in a state when the backup power supply terminal is coupled to the internal power supply node and the main power supply terminal is decoupled from the internal power supply node, if an incorrect determination that the voltage of the main power supply has risen above the predetermined voltage is made due to a noise and if a period of the voltage rise is longer than the above switching transition time, then the backup power supply terminal is decoupled from the internal power supply node after the main power supply terminal is coupled to the internal power supply node and, thereby, supply of power to the internal node stops, which results in malfunction of the clock circuit. This fact was revealed by the present inventors.

The above-noted and other objects and novel features of the present invention will become apparent from the following description in the present specification and the accompanying drawings.

A typical aspect of the invention disclosed herein is summarized as follows.

A first switching transition time after coupling the main power supply terminal to the internal power supply node until decoupling the backup power supply terminal from the internal power supply node is made longer than a second switching transition time after coupling the backup power supply terminal to the internal power supply node until decoupling the main power supply terminal from the internal power supply node.

Advantageous effects that will be achieved by a typical aspect of the invention disclosed herein are briefly described below.

A preferred effect of the second switching time that is shorter than the first switching time is eliminating wasteful consumption of the backup power supply attributed to the fact that current flows from the backup power supply back to a circuit powered by the main power supply. A preferred effect of the first switching time that is longer than the second switching time is ensuring that power supply via the backup power supply terminal does not stop, even if an incorrect determination that the voltage at the main power supply terminal has recovered is made because of a noise, when the semiconductor device is operating on power from the backup power supply.

DETAILED DESCRIPTION

1. General Outline of Embodiments

Figure 1:
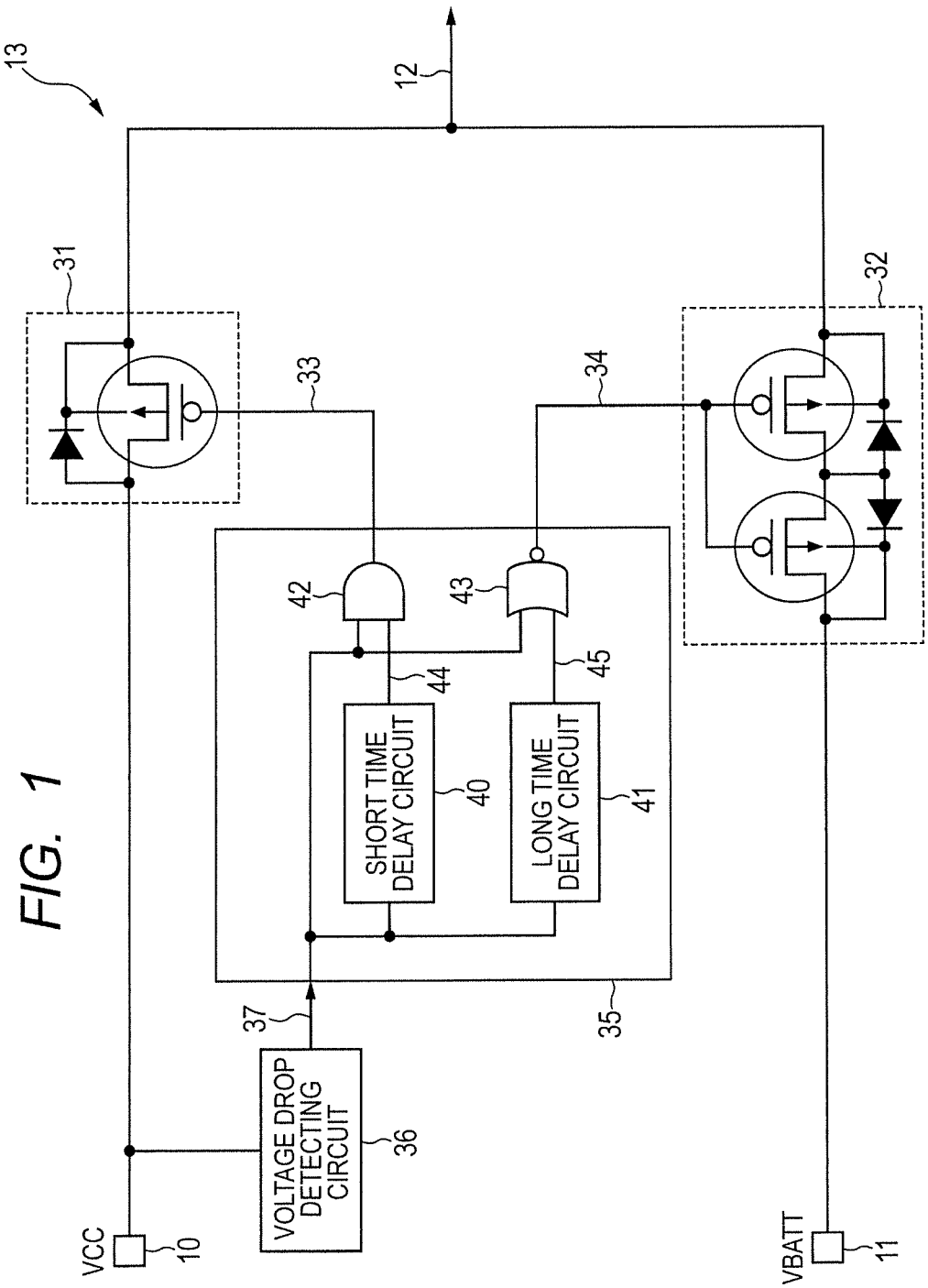
FIG. 1 is a block diagram depicting a concrete example of a switch control circuit for coupling one of the power supply terminals to the internal power supply node.

To begin with, exemplary embodiments of the present invention disclosed herein are outlined. In the following general description of exemplary embodiments, reference designators (numerals) in the drawings, which are given for referential purposes in parentheses, are only illustrative of elements that fall in the concepts of the components identified by the designators.

[1] <Longer Transition Time of Switching from a Backup Power Supply Terminal to a Main Power Supply Terminal>

A semiconductor device (1, 1A) includes a prescribed internal circuit (14) that operates on power supplied by coupling one of two types of power supply terminals, a main power supply terminal (10) which is coupled to a main power supply (2) and a backup power supply terminal (11) which is coupled to a backup power supply (3), to an internal power supply node (12). Switching the coupling between the two terminals is made by a switchover circuit (13, 13A). The switchover circuit makes a first switching transition time (DLY1) when switching the terminal being coupled to the internal power supply node from the backup power supply terminal to the main power supply terminal longer than a second switching transition time (DLY2) when switching from the main power supply terminal to the backup power supply terminal.

As per the foregoing, a preferred effect of the second switching time that is shorter than the first switching time is eliminating wasteful consumption of the backup power supply attributed to the fact that current flows from the backup power supply back to a circuit powered by the main power supply. A preferred effect of the first switching time that is longer than the second switching time is ensuring that power supply via the backup power supply terminal does not stop, even if an incorrect determination that the voltage at the main power supply terminal has recovered is made because of a noise, when the semiconductor device is operating on power from the backup power supply. Therefore, it is possible to prevent malfunction of the internal circuit because of unwanted power supply switching caused by a noise during operation of the semiconductor device powered by the backup power supply, while eliminating wasteful consumption of the backup power supply.

[2] <MOS Switch Circuits Forming the Switchover Circuit>

The switchover circuit, as set forth in section [1], includes a first MOS switch circuit (31) placed between the main power supply terminal and the internal power supply node and a second MOS switch circuit (32) placed between the backup power supply terminal and the internal power supply node.

As per the foregoing, a circuit that performs coupling/decoupling one of the power supply terminals to/from the internal node can simply be implemented.

[3] <Switch Control Circuit that Controls ON/OFF Switching of the MOS Switch Circuits>

The switchover circuit, as set forth in section [2], includes a switch control circuit (35) that controls ON/OFF switching of the first MOS switch circuit and the second MOS switch circuit.

As per the foregoing, coupling/decoupling one of the power supply terminals to/from the internal node can be performed by controlling ON/OFF switching of the MOS switch circuits.

[4] <A Scheme of Controlling ON/OFF Switching by the Switch Control Circuit>

The switch control circuit, as set forth in section [3], performs control to make a response time for turning the first MOS switch circuit from an ON state to an OFF state longer than a response time for turning it from an OFF state to an ON state and make a response time for turning the second MOS switch circuit from an ON state to an OFF state longer than a response time for turning it from an OFF state to an ON state.

As per the foregoing, the switching transition times can be determined by the response times for turning the MOS switch circuits from an ON state to an OFF state and vice versa.

[5] <Switch Control Circuit Operating on Power Supplied from the Internal Power Supply Node>

The switch control circuit, as set forth in section [3], operates on power supplied from the internal power supply node.

As per the foregoing, preventing malfunction of the switch control circuit can easily be assured.

[6] <A Voltage Drop Detecting Circuit and the Switch Control Circuit Operating on Power that is Output by a Regulator>

The switch control circuit, as set forth in section [3], operates on power that is output by a voltage regulator (160) capable of lowering the voltage of a power supply which is supplied via the two power supply terminals; the main power supply terminal and the backup power supply terminal.

As per the foregoing, noise proofness can be enhanced, because the switch control circuit is supplied with operating power via the voltage regulator.

[7] <Clock Circuit>

The prescribed internal circuit, as set forth in section [1], includes a clock circuit (18) operating on power that is assured by a power supply supplied from the internal power supply node.

As per the foregoing, it is possible to prevent a risk that, in a state when the backup power supply terminal is coupled to the internal power supply node and the main power supply terminal is decoupled from the internal power supply node, interruption of power supply to the internal power supply node occurs, attributed to a noise in a power supply path or an induction noise, and the clock circuit malfunctions.

[8] <Volatile Memory>

The prescribed internal circuit, as set forth in section [1], includes a volatile memory (16) operating on power that is assured by a power supply supplied from the internal power supply node.

As per the foregoing, it is possible to prevent a risk that, in a state when the backup power supply terminal is coupled to the internal power supply node and the main power supply terminal is decoupled from the internal power supply node, interruption of power supply to the internal power supply node occurs, attributed to a noise in a power supply path or an induction noise, and information stored in the volatile memory is lost.

[9] <Longer Transition Time of Switching from a Backup Power Supply Terminal to a Main Power Supply Terminal>

A semiconductor device (1, 1A) includes a prescribed internal circuit (14) that operates on power supplied by coupling one of two types of power supply terminals, a main power supply terminal (10) which is coupled to a main power supply (2) and a backup power supply terminal (11) which is coupled to a backup power supply (3), to an internal power supply node (12). Switching the coupling between the two terminals is made by a switchover circuit (13, 13A). In a process of switching to couple one of the two types of power supply terminals to the internal power supply node, the switchover circuit delays decoupling of a power supply terminal to be decoupled later than coupling of a power supply terminal to be coupled and makes a delay when switching the terminal being coupled to the internal power supply node from the backup power supply terminal to the main power supply terminal longer than a delay when switching from the main power supply terminal to the backup power supply terminal.

As per the foregoing, by delaying decoupling of a power supply terminal to be decoupled later than coupling of a power supply terminal to be coupled, it is eliminated that decoupling of a power supply terminal to be decoupled takes place before supply of power from a power supply to be coupled. By making a delay when switching the terminal being coupled to the internal power supply node from the backup power supply terminal to the main power supply terminal longer than a delay when switching from the main power supply terminal to the backup power supply terminal, power supply via the backup power supply terminal will not stop, even if an incorrect determination that the voltage at the main power supply terminal has recovered is made because of a noise, when the semiconductor device is operating on power from the backup power supply. Moreover, the delay when switching the terminal being coupled to the internal power supply node from the main power supply terminal to the backup power supply terminal is shorter than the delay when switching from the backup power supply terminal to the main power supply terminal. So, this can contribute to eliminating wasteful consumption of the backup power supply attributed to the fact that current flows from the backup power supply back to a circuit powered by the main power supply.

[10] <Circuits that Produce Delays>

The switchover circuit, as set forth in section [9], includes a comparison circuit (36) which compares a supply voltage supplied to the main power supply terminal with a reference voltage, a first delay circuit (40) which receives, as input, an output of the comparison circuit, waits for a first delay time upon the input, and reflects a level change of the input to its output, a second delay circuit (41) which receives, as input, an output of the comparison circuit, waits for a second delay time that is longer than the first delay time upon the input, and reflects a level change of the input to its output, a first logical gate circuit (42) which receives, as input, an output of the comparison circuit and an output of the first delay circuit and generates a first signal (33) to control coupling/decoupling of the main power supply terminal to/from the internal power supply node, and a second logical gate circuit (43) which receives, as input, an output of the comparison circuit and an output of the second delay circuit and generates a second signal (34) to control coupling/decoupling of the backup power supply terminal to/from the internal power supply node.

As per the foregoing, the switchover circuit can easily be implemented.

[11] <Switch Circuits>

The switchover circuit, as set forth in section [10], includes a first MOS switch circuit (31) which is placed between the main power supply terminal and the internal power supply node and ON/OFF controlled by the first signal and a second MOS switch circuit (32) which is placed between the backup power supply terminal and the internal power supply node and ON/OFF controlled by the second signal.

As per the foregoing, a circuit that performs coupling/decoupling one of the power supply terminals to/from the internal node can simply be implemented.

[12] <A Scheme of Controlling ON/OFF Switching of the Switches>

As set forth in section [11], a response time for turning the first MOS switch circuit from an ON state to an OFF state circuit is made longer than a response time for turning it from an OFF state to an ON state and a response time for turning the second MOS switch circuit from an ON state to an OFF state is made longer than a response time for turning it from an OFF state to an ON state.

As per the foregoing, the delay times for switching between the power supply terminals can be determined by the response times for turning the MOS switch circuits from an ON state to an OFF state and vice versa.

[13] <Longer Transition Time of Switching from a Backup Power Supply Terminal to a Main Power Supply Terminal>

A semiconductor device (1, 1A) includes a switchover circuit (13, 13A) that performs switching to couple one of two types of power supply terminals, a main power supply terminal (10) which is coupled to a main power supply (2) and a backup power supply terminal (11) which is coupled to a backup power supply (3), to an internal power supply node (12), and a clock circuit (18) that operates on power supplied via the main power supply terminal or the backup power supply terminal selectively coupled to the internal power supply node through switching by the switchover circuit. In a process of switching to couple one of the two types of power supply terminals to the internal power supply node, the switchover circuit makes a decoupling transition time when decoupling a power supply terminal to be decoupled longer than a coupling transition time when coupling a power supply terminal to be coupled and makes a switching transition time when switching the terminal being coupled to the internal power supply node from the backup power supply terminal to the main power supply terminal longer than a switching transition time when switching from the main power supply terminal to the backup power supply terminal.

As per the foregoing, by delaying decoupling of a power supply terminal to be decoupled later than coupling of a power supply terminal to be coupled, it is eliminated that decoupling of a power supply terminal to be decoupled takes place before supply of power from a power supply to be coupled. By making a delay when switching the terminal being coupled to the internal power supply node from the backup power supply terminal to the main power supply terminal longer than a delay when switching from the main power supply terminal to the backup power supply terminal, power supply via the backup power supply terminal will not stop, even if an incorrect determination that the voltage at the main power supply terminal has recovered is made because of a noise, when the semiconductor device is operating on power from the backup power supply. Thus, it is possible to prevent a risk that, in a state when the backup power supply terminal is coupled to the internal power supply node and the main power supply terminal is decoupled from the internal power supply node, interruption of power supply to the internal power supply node occurs, attributed to a noise in a power supply path or an induction noise, and the clock circuit malfunctions. Moreover, the delay when switching the terminal being coupled to the internal power supply node from the main power supply terminal to the backup power supply terminal is shorter than the delay when switching from the backup power supply terminal to the main power supply terminal. So, this can contribute to eliminating wasteful consumption of the backup power supply attributed to the fact that current flows from the backup power supply back to a circuit powered by the main power supply.

[14] <MOS Switch Circuits Forming the Switchover Circuit>

The switchover circuit, as set forth in section [13], includes a first MOS switch circuit (31) placed between the main power supply terminal and the internal power supply node and a second MOS switch circuit (32) placed between the backup power supply terminal and the internal power supply node.

As per the foregoing, a circuit that performs coupling/decoupling one of the power supply terminals to/from the internal node can simply be implemented.

[15] <Switch Control Circuit that Controls ON/OFF Switching of the MOS Switch Circuits>

The switchover circuit, as set forth in section [14], includes a switch control circuit (35) that controls ON/OFF switching of the first MOS switch circuit and the second MOS switch circuit.

As per the foregoing, coupling/decoupling one of the power supply terminals to/from the internal node can be performed by controlling ON/OFF switching of the MOS switch circuits.

[16] <A Scheme of Controlling ON/OFF Switching by the Switch Control Circuit>

The switch control circuit, as set forth in section [15], performs control to make a response time for turning the first MOS switch circuit from an ON state to an OFF state longer than a response time for turning it from an OFF state to an ON state and make a response time for turning the second MOS switch circuit from an ON state to an OFF state longer than a response time for turning it from an OFF state to an ON state.

As per the foregoing, the delay times for switching between the power supply terminals can be determined by the response times for turning the MOS switch circuits from an ON state to an OFF state and vice versa.

[17] <Function of Capturing Time Information in Response to an Event Input>

The semiconductor device, as set forth in section [13], includes a storage circuit (16) into which the clock circuit stores time information in response to a given event input from outside and the storage circuit is powered by the same power supply that powers the clock circuit.

As per the foregoing, there is not a risk that interruption of power supply to the storage circuit occurs, attributed to a noise and, thus, time information once stored in the storage circuit will not be lost.

2. Details on Embodiments

Embodiments of the invention will then be described in greater detail.

Figure 2:
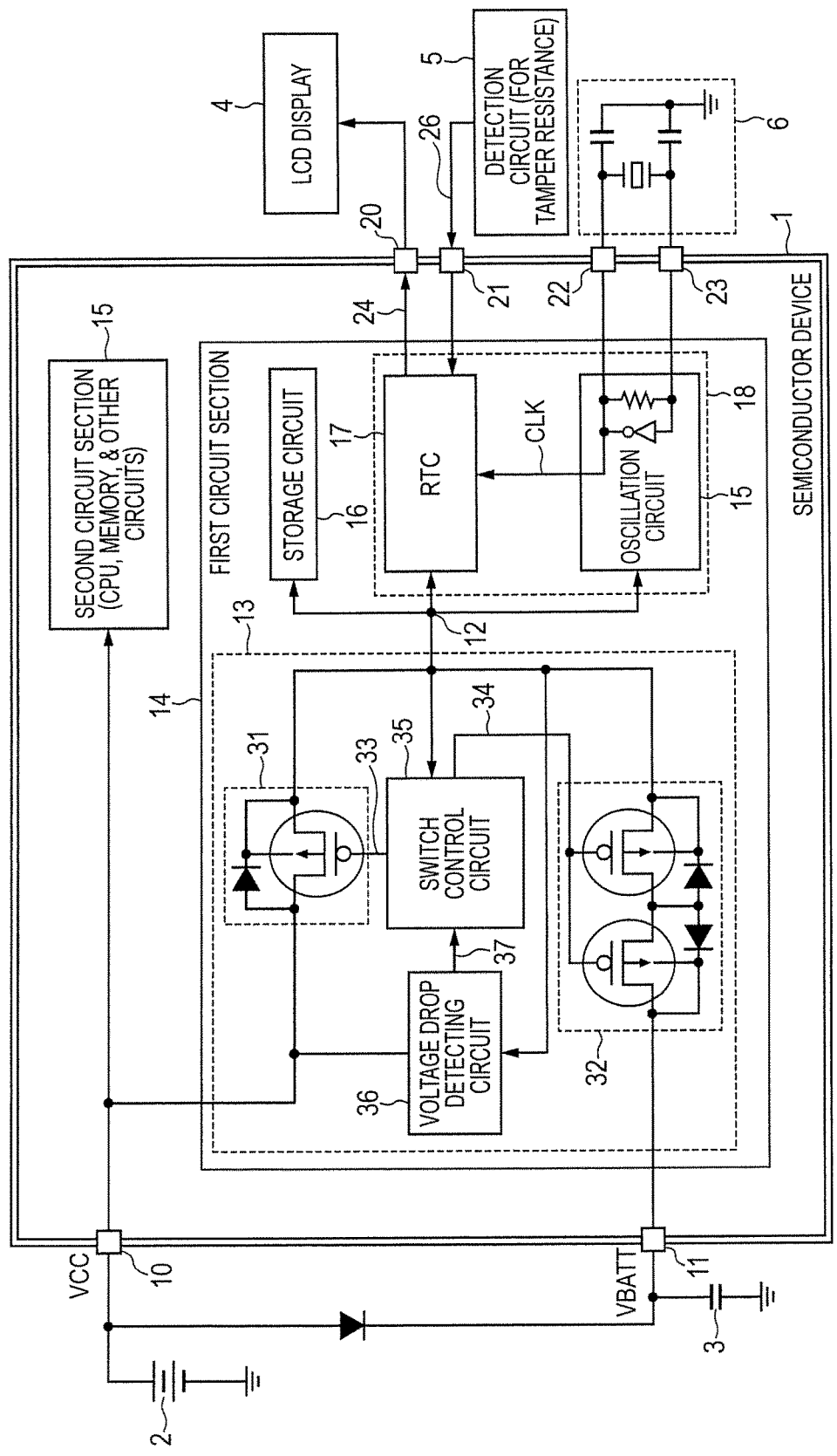
FIG. 2 is a block diagram illustrating a semiconductor device pertaining to an embodiment of the invention and an overview of a structure of a system using the semiconductor device.

FIG. 2 illustrates a semiconductor device pertaining to an embodiment of the invention and an overview of a structure of a system using the semiconductor device. Reference numeral 1 denotes a semiconductor device; 2 denotes a main power supply; 3 denotes a backup power supply; 4 denotes an LCD display; 5 denotes a detection circuit; and 6 denotes an oscillator circuit.

Although not restrictive, the semiconductor device 1 is formed over a single semiconductor substrate like a single crystal silicon substrate by CMOS integrated circuit fabrication technology or the like. The semiconductor device 1 includes a prescribed internal circuit (first circuit section) 14 that operates on power supplied by coupling one of two types of power supply terminals, a main power supply terminal 10 which is coupled to the main power supply 2 and a backup power supply terminal 11 which is coupled to the backup power supply 3, to an internal power supply node 12. Switching the coupling between the two terminals is made by a switchover circuit 13. The semiconductor device 1 also includes another circuit section (second circuit section) 15 that operates on power from the main power supply supplied via the main power supply terminal 10. Supply voltage of the main power supply 2 is denoted by VCC and supply voltage of the backup power supply 3 is denoted by VBATT in the drawing. By way of example, a dual-layer electric capacitor with a capacity of several tens of millifarads (mF) is used as the backup power supply 3 in this embodiment. This dual-layer electric capacitor is charged by the main power supply 2 via a diode.

In the following description, the semiconductor device 1 is assumed as, e.g., a microcontroller. The second circuit section 15 includes a Central Processing Unit (CPU) which executes instructions, a memory which is used for a working area for the CPU, and CPU peripheral circuits such as input/output ports.

The first circuit section 14 includes the switchover circuit 13 which performs switching to couple one of the two types of power supplies, the main power supply terminal 10 and the backup power supply terminal 11, to an internal power supply node 12, and a clocking timer (RTC) 17, a volatile storage circuit 16, and an oscillation circuit 15 which operate on power supplied via the main power supply terminal 10 or the backup power supply terminal 11 selectively coupled to the internal power supply node through switching by the switchover circuit 13. The RTC 17 includes a timer counter which measures and records time in hours, minutes, and seconds and a timer control circuit. A clock signal CLK that is counted by the timer counter is supplied from the oscillation circuit 15. To the oscillation circuit 15, for example, the oscillator circuit 6 is coupled via clock terminals 22, 23.

The RTC 17 and the oscillation circuit 15 make up a clock circuit 18. Time information 24 representing time in minutes and seconds, when created by the RTC 17, is output to the LCD display 4 via a time output terminal 20 and the LCD display 4 displays time according to the time information 24 input thereto. Time information is widely used for reservation management among others in addition to time display. While time setting for the RTC 17 can be performed using the CPU 15 or the like, the RTC 17 for which time setting is done is required to continue its timer operation. This is for maintaining the reliability of equipment using the time information and reducing a burden of performing time setting again.

The detection circuit 5 detects the occurrence of a predefined event and outputs an event signal 26. The RTC 17 stores time information in the storage circuit 16 at the point of time when the event signal 26 has been input to the RTC 17 via an event input terminal 21. Given that the semiconductor device 1 is incorporated in a system requiring some security, this contributes to the realization of tamper resistance in such a manner that an event signal 26 is generated when the system chassis has been opened without permission and its trace is recorded by time information.

The switchover circuit 13 includes a first MOS switch circuit 31 placed between the main power supply terminal 10 and the internal power supply node 12, a second MOS switch circuit 32 placed between the backup power supply terminal 11 and the internal power supply node 12, a switch control circuit 35, and a voltage drop detecting circuit 36.

By way of example, the MOS switch circuits 31, 32 are each configured using P-channel type power MOS transistors in this embodiment. For the MOS switch circuit 31, a power MOS transistor is coupled between the main power supply terminal 10 and the internal node 12 with the anode of its body diode being oriented toward the main power supply terminal. For the MOS switch circuit 32, two power MOS transistors are coupled in series between the backup power supply terminal 11 and the internal node 12 with the respective anodes of the body diodes of the power MOS transistors facing each other. These MOS switch circuits 31, 32 may be formed of switch elements not limited to power MOS transistors and their conductivity type is also not limited to a P-channel type.

According to a detection signal 37 detected by the voltage drop detecting circuit 36, the switch control circuit 35 makes a switch control signal 23 for the first MOS switch circuit 31 and a switch control signal 24 for the second MOS switch circuit 32. The voltage drop detecting circuit 36 judges whether or not the supply voltage VCC of the main power supply 2, which is supplied via the main power supply terminal 10, has fallen at or below a lower limit voltage for assuring operation, and turns its detection signal 37 to a high level when the supply voltage VCC has fallen at or below the lower limit voltage for assuring operation and turns its detection signal 37 to a low level when the supply voltage VCC has risen above the lower limit voltage for assuring operation.

Figure 3:
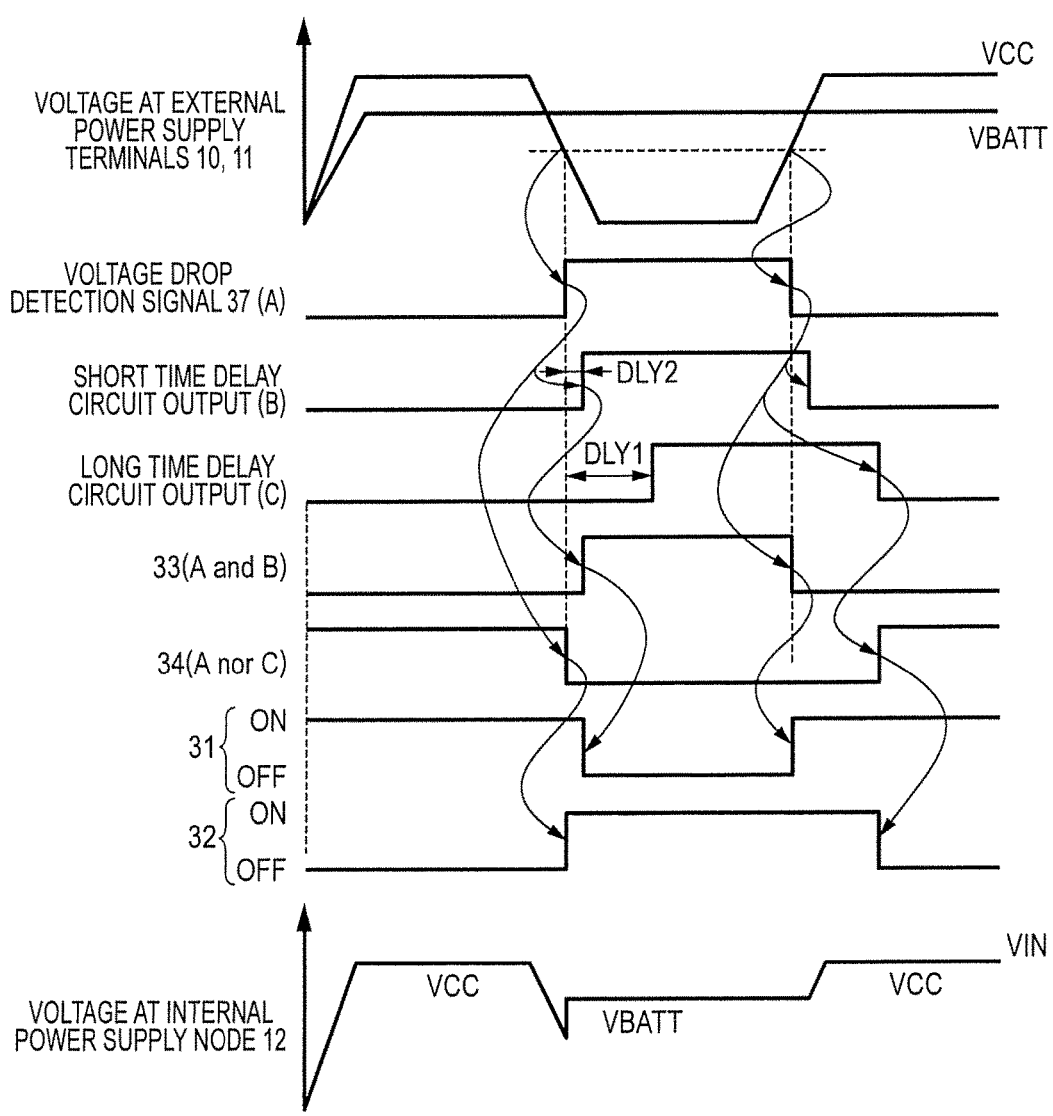
FIG. 3 is a timing chart illustrating timing of control of ON/OFF switching of the MOS switches for coupling one of the power supply terminals to the internal power supply node.

In response to turning of the detection signal 37 to a high level, the switch control circuit 35 turns the first MOS switch circuit 31 OFF and turns the second MOS switch circuit 32 ON, thus switching the operating power supply which is supplied to the internal power supply node 12 from the main power supply 2 to the backup power supply 3. On the other hand, in response to turning of the detection signal 37 to a low level, the switch control circuit 35 turns the second MOS switch circuit 32 OFF and turns the first MOS switch circuit 31 ON, thus switching the operating power supply which is supplied to the internal power supply node 12 from the backup power supply 3 to the main power supply 2. When such switching is performed, switching control timing, as is illustrated in FIG. 3, is arranged such that, in a process of switching to couple one of the main power supply terminal 10 and the backup power supply terminal 11 to the internal power supply node 12, decoupling of a power supply terminal to be decoupled is delayed later than coupling of a power supply terminal to be coupled to avoid a state in which both terminals are decoupled from the internal node. That is, the second MOS transistor circuit 32 is turned ON before the first MOS transistor circuit 31 is turned OFF and the first MOS transistor circuit 31 is turned ON before the second MOS transistor circuit 32 is turned OFF. Moreover, a first switching transition time DLY1 when switching the terminal being coupled to the internal power supply node 12 from the backup power supply terminal 11 to the main power supply terminal 10 is arranged to be longer than a second switching transition time DLY2 when switching from the main power supply terminal 10 to the backup power supply terminal 11.

The switch control circuit 35 that implements the above-described function, as is illustrated in FIG. 1, includes a short time delay circuit 40, a long time delay circuit 41, an AND gate 42, and a NOR gate 43. The short time delay circuit 40, upon receiving an input of a detection signal 37, waits for a second delay time of, e.g., approx. 1 ns and reflects a level change of the input to its output. The long time delay circuit 41, upon receiving an input of a detection signal 37, waits for a first delay time exceeding a noise duration presumed and reflects a level change of the input to its output. The AND gate 42 outputs a logical product signal of an output of the short time delay circuit 40 and a detection signal 37 as a switch control signal 33. The NOR gate 43 outputs a negative logical sum signal of an output of the long time delay circuit 41 and a detection signal 37 as a switch control signal 34. In FIG. 3, reference numeral 44 denotes an output signal of the short time delay circuit 40 and 45 denotes an output signal of the long time delay circuit 41. The first delay time corresponds to the first switching transition time DLY1 and the second delay time corresponds to the second switching transition time DLY2.

Figure 4:
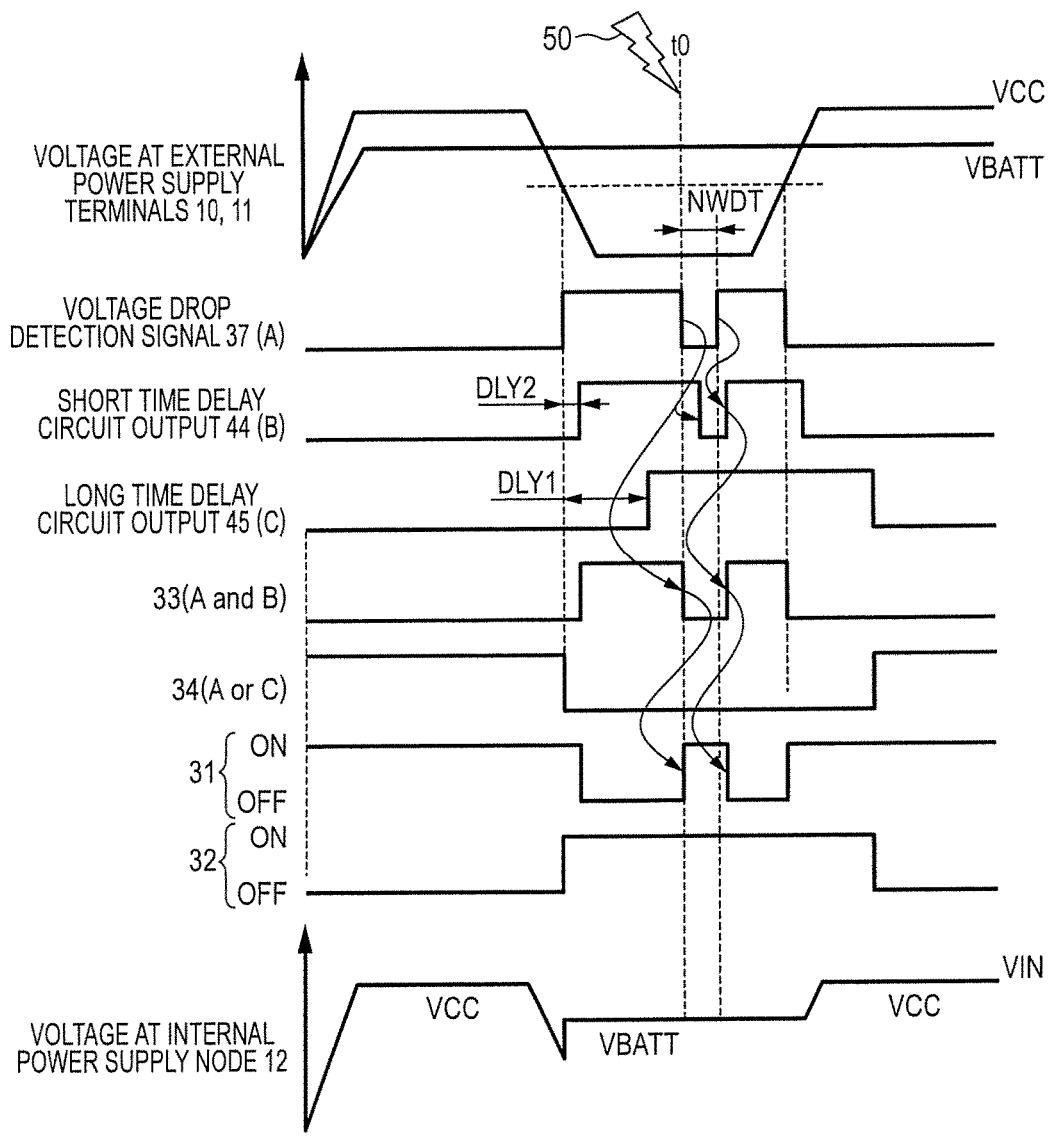
FIG. 4 is a timing chart illustrating operating timing of a switchover circuit 13 in a situation where a noise occurred, in which the noise duration NWDT is shorter than a first switching transition time DLY1.

Here, the above noise duration presumed is a maximum level inversion period of possible unwanted level inversion of a detection signal 37 attributed to a noise in a power supply path or an induction noise. FIG. 4 illustrates operating timing of the switchover circuit 13 in a situation where a noise occurred, in which the noise duration NWDT is shorter than the first switching transition time DLY1 which is the first delay time. In this situation, there is the following relation: DLY2<NWDT<DLY1. In a state when the backup power supply terminal 11 has been coupled to the internal power supply node 12 after the main power supply terminal 10 is decoupled from the internal node 12, when a detection signal 37 undergoes level inversion for the noise duration NWDT due to a noise 50 (time t0), the output 44 of the short time delay circuit 40 receiving the detection signal with the level change undergoes level inversion in synchronization with the level change, because its switching transition time is shorter than the noise duration NWDT. However, the output 45 of the long time delay circuit 41 receiving the detection signal with the level change does not undergo level inversion due to the level change, because its switching transition time is longer than the noise duration NWDT. Therefore, the first MOS switch circuit 31 which is coupled to the main power supply terminal 10 is put in an ON state for a given period corresponding to the noise duration NWDT from time t0, whereas the second MOS switch circuit 32 which is coupled to the backup power supply terminal 11 remains in an ON state. Therefore, in a state when the main power supply 2 is not supplied via the main power supply terminal 10 and a necessary operating power supply is supplied from the backup power supply 3, occurrence of a situation that supply of the backup power supply 3 also stops can be prevented.

Figure 5:
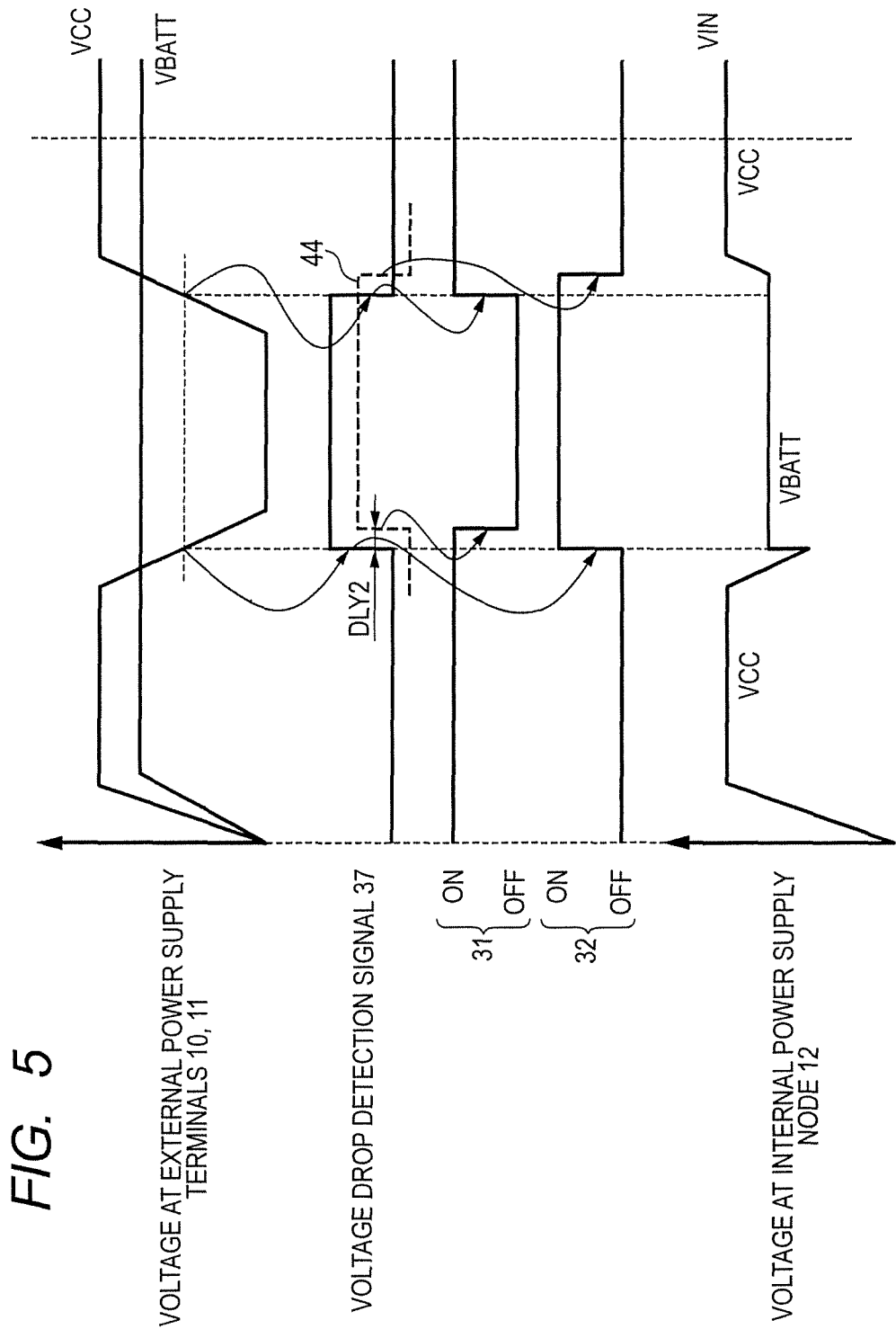
FIG. 5 is a timing chart pertaining to a comparison example, illustrating timing of control of ON/OFF switching of the MOS switches, given that a short time delay circuit was only used in the switch control circuit.
Figure 6:
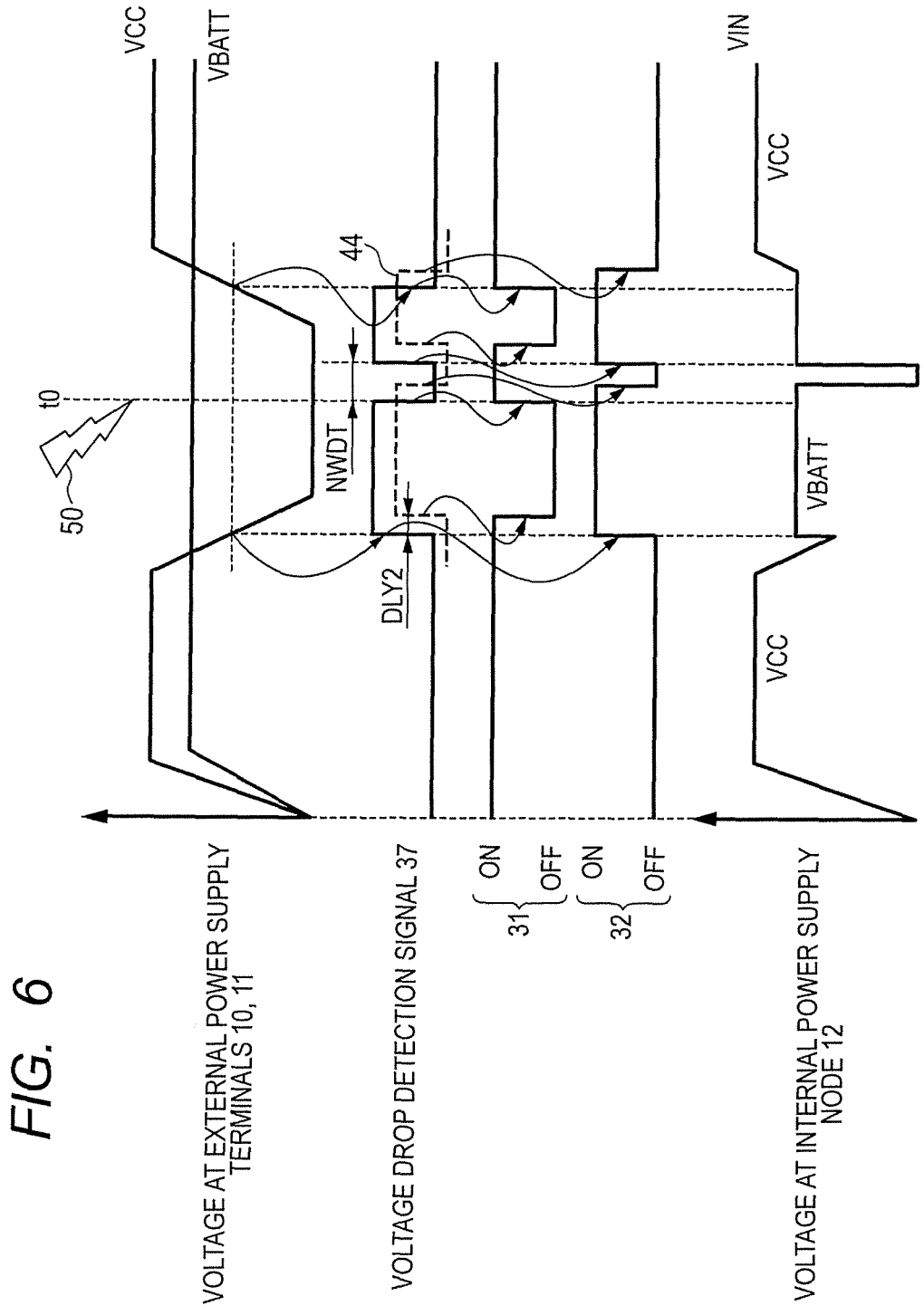
FIG. 6 is a timing chart pertaining to a comparison example, illustrating ON/OFF switching timing in a case where a noise occurs, in which the noise duration NWDT is longer than a switching transition time DLY2, in the comparison example of FIG. 5.

Given that the output 44 of the short time delay circuit 40 was input to both the AND gate 42 and the NOR gate 43 in FIG. 1, the second switching transition time DLY2 only would take place as the transition time for switching performed by the first switch circuit 31 and the second switch circuit 32, as is illustrated in FIG. 5. Consequently, in a state when the backup power supply terminal 11 has been coupled to the internal power supply node 12 after the main power supply terminal 10 is decoupled from the internal node 12, when a detection signal 37 undergoes level inversion for the noise duration NWDT due to a noise 50 (time t0), as is illustrated in FIG. 6, the output 44 of the short time delay circuit 40 receiving the detection signal with the level change undergoes level inversion in synchronization with the level change, because its switching transition time is shorter than the noise duration NWDT. Therefore, the first MOS switch circuit 31 which is coupled to the main power supply terminal 10 is inverted to an ON state for a given period corresponding to the noise duration NWDT from time t0 and the second MOS switch circuit 32 which is coupled to the backup power supply terminal 11 is inverted to an OFF state for that period. Therefore, a state is produced in which the main power supply 2 is not supplied via the main power supply terminal 10 and a necessary operating power supply is not supplied from the backup power supply 3 as well. It follows that the RTC 17 malfunctions and information stored in the storage circuit 16 is ruined.

As described previously, the switchover circuit 13 is arranged such that the first switching transition time DLY1 when switching the terminal being coupled to the internal power supply node 12 from the backup power supply terminal 11 to the main power supply terminal 10 is longer than the second switching transition time DLY2 when switching from the main power supply terminal 10 to the backup power supply terminal 11. This provides the following advantageous effects.

(1) The second switching transition time DLY2 that is shorter than the first switching transition time DLY1 can contribute to eliminating wasteful consumption of the backup power supply 3 attributed to the fact that current flows from the backup power supply 3 back to the second circuit section 15 powered by the main power supply when switching from the main power supply 2 to the backup power supply 3.

(2) The first switching transition time DLY1 that is longer than the second switching transition time DLY2 ensures that power supply via the backup power supply terminal 11 does not stop, even if the voltage drop detecting circuit 36 makes an incorrect determination that the voltage at the main power supply terminal 10 has recovered because of a noise, when the semiconductor device 1 is operating on power from the backup power supply 3. This prevents a risk that, in a state when the backup power supply terminal 11 is coupled to the internal power supply node 12 and the main power supply terminal 10 is decoupled from the internal power supply node 12, interruption of power supply to the internal power supply node 12 occurs, attributed to a noise in a power supply path or an induction noise, and the clock circuit malfunctions. Therefore, it is possible to eliminate wasteful consumption of the backup power supply 3 in the state when the main power supply 2 is not supplied to the main power supply terminal 10 and prevent malfunction of the RTC 17 or the like because of unwanted power supply switching caused by a noise during operation of the semiconductor device powered by the backup power supply 3.

(3) For instance, before shipment of equipment with the semiconductor device 1 incorporated in it, which uses time information provided by the clock circuit 18, time setting is done in advance for the clock circuit 18 and the clock circuit 18 is made to continue to operate, powered by the backup power supply 3 for the sake of convenience for users. When installing the equipment shipped in this state, the user may carry out work such as coupling the equipment to another unit of equipment in the state that the main power supply 2 is not coupled. When doing so, even if a relatively large noise occurs due to cable coupling or the like, the above-described behavior of the switchover circuit 13 makes it possible to prevent malfunction occurrence because of temporary loss of the power supply to the clock circuit 18.

(4) Given that the semiconductor device 1 is incorporated in a system requiring some security (e.g., a gas meter and an electricity meter), tamper resistance is realized in such a manner that an event signal 26 is generated when the system chassis has been opened without permission and time information at the point of time is recorded as its trace in the storage circuit 16. At this time, when the semiconductor device is powered by the backup power supply 3, it can be prevented that power feeding to the clock circuit 18 and the storage circuit 16 stops, attributed to a noise in a power supply path or an induction noise. Thus, it is possible to contribute to ensuring tamper resistance of a system such as a gas meter and an electricity meter.

(5) Since the switch control circuit 35 operates on power supplied via the internal power supply node 12, preventing malfunction of the switch control circuit 35 can be ensured simply.

Figure 7:
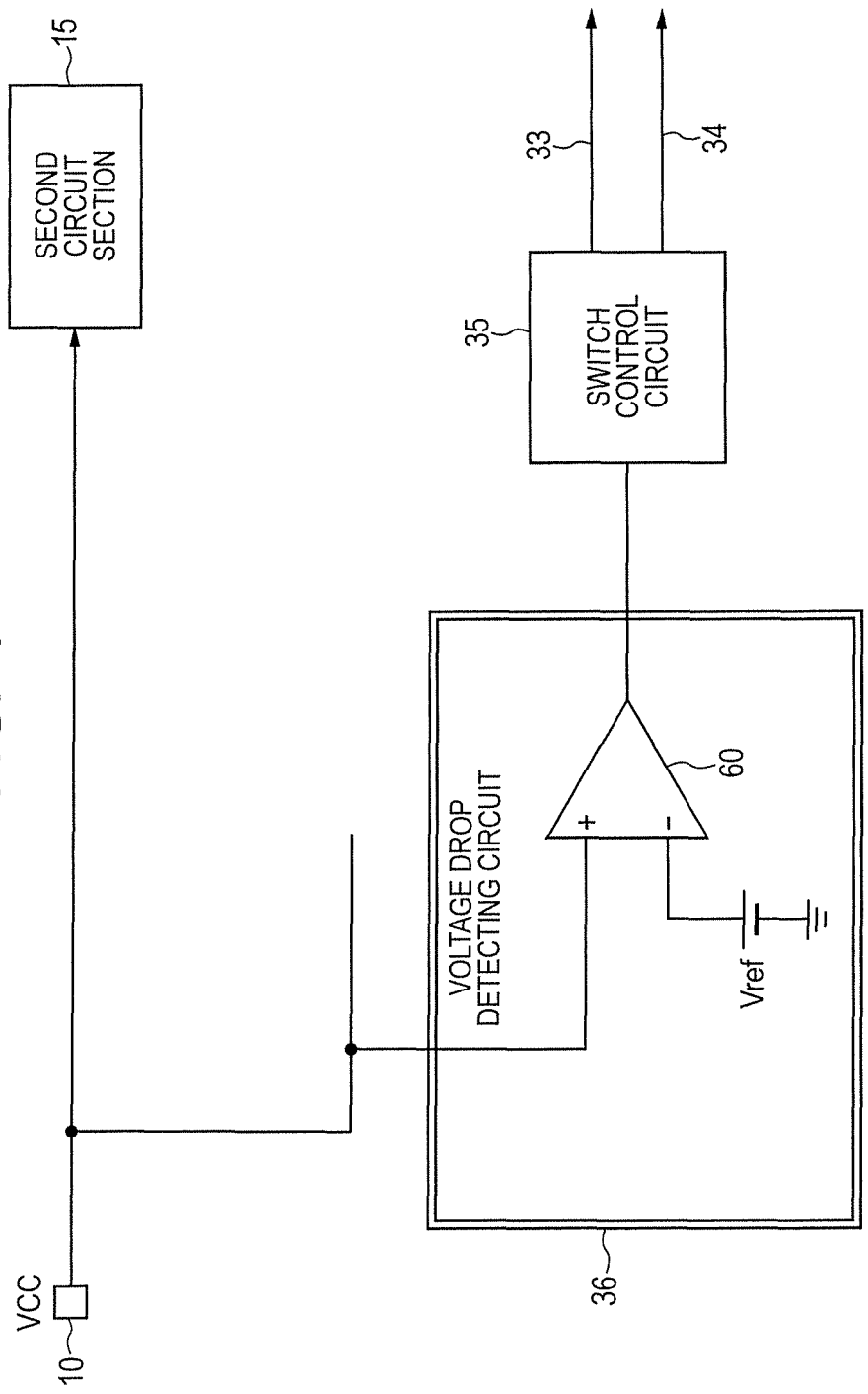
FIG. 7 is a circuit diagram depicting an example of a voltage drop detecting circuit.

FIG. 7 depicts an example of the voltage drop detecting circuit 36. A non-inverting input terminal (+) of a comparator 60 is coupled to the main power supply terminal 10 and a reference voltage Vref is applied to an inverting input terminal (−) of the comparator 60. The reference voltage Vref may preferably be set equal to a required lower limit voltage for assuring operation.

Figure 8:
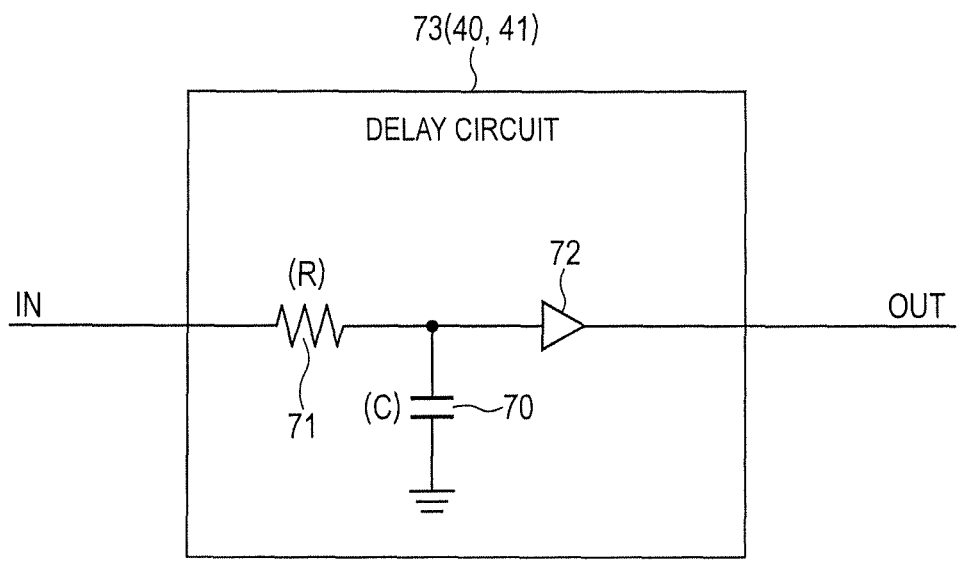
FIG. 8 is a block diagram illustrating a delay circuit configuration that is applied to a short time delay circuit and a long time delay circuit.

FIG. 8 illustrates a delay circuit configuration that is applied to the short time delay circuit 40 and the long time delay circuit 41. A delay circuit 73 is configured as a CR delay circuit formed of a capacitor (with a capacitance value C) 70, a resistor (with a resistance value R) 71, and an output buffer 72. A time constant of a CR delay circuit is set so that the time constant of the long time delay circuit 41 will be larger than that of the short time delay circuit 40. For example, when the R×C value of the short time delay circuit 40 is set to 1.442 ($10^{-9} \times \Omega \times F$), its delay time is set to 1 (ns). When the R×C value of the long time delay circuit 41 is set to 14420 ($10^{-9} \times \Omega \times F$), its delay time is set to 10,000 (ns). As for wiring delay in this case, when the R×C value is 1 ($10^{-9} \times \Omega \times F$), a delay time is set to 0.7 (ns). A delay time larger than wiring delay is set for the delay time of each delay circuit 40, 41.

Figure 9:
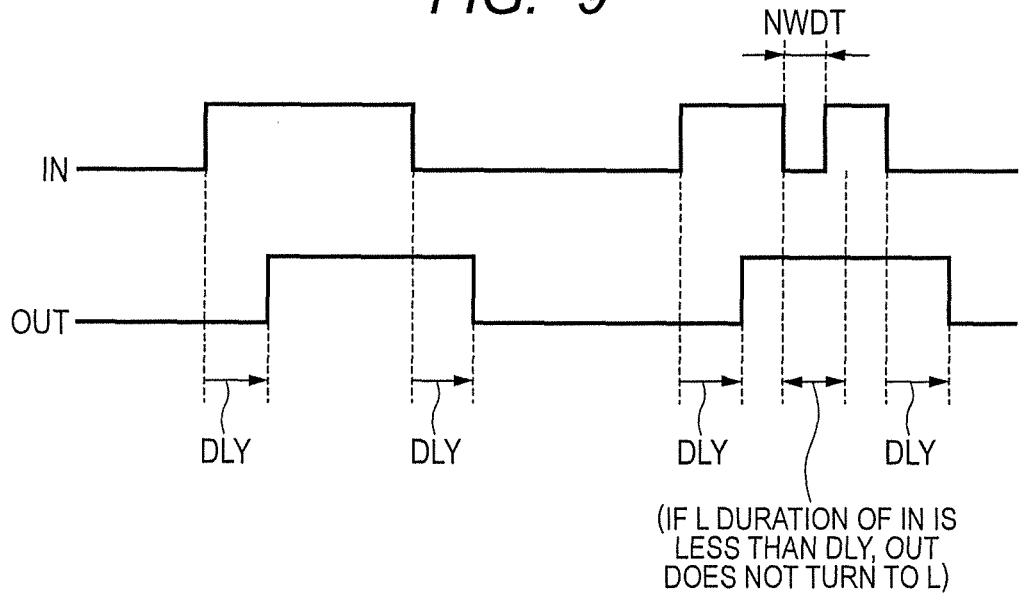
FIG. 9 is a timing chart illustrating input and output waveforms for the delay circuit of FIG. 8.

FIG. 9 illustrates input and output waveforms for the delay circuit 73. IN is an input to the delay circuit 73 and corresponds to a voltage drop detecting signal 37. OUT is an output of the delay circuit 73. DLY is a delay time set for the delay circuit 73. If a turbulence duration NWDT in the input signal IN is smaller than the duration of the delay time DLY, the turbulence in the input does not affect the output OUT.

Figure 10:
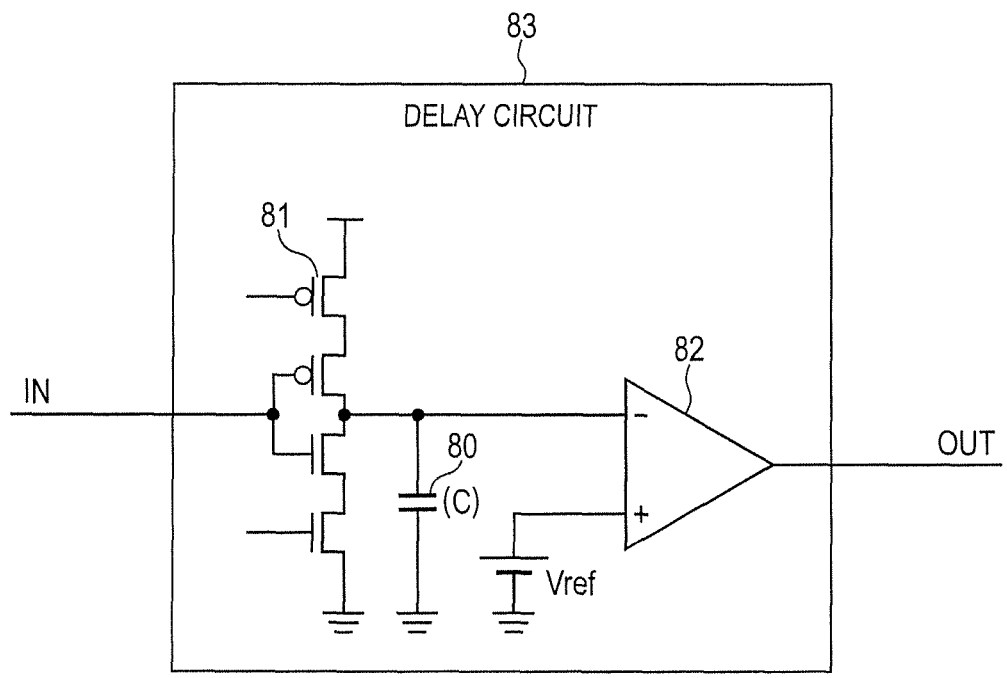
FIG. 10 is a block diagram illustrating another delay circuit configuration that is applied to the short time delay circuit and the long time delay circuit.

FIG. 10 illustrates another delay circuit configuration that is applied to the short time delay circuit 40 and the long time delay circuit 41. A delay circuit 83 depicted in FIG. 10 produces a desired delay time by comparing a voltage of charging a capacitor 80 via an inverter 81 and discharged from the capacitor 80 with a reference voltage Vref by a comparator 82. The delay time length is set depending on the reference voltage Vref or the capacitance value of the capacitor 80.

Figure 11:
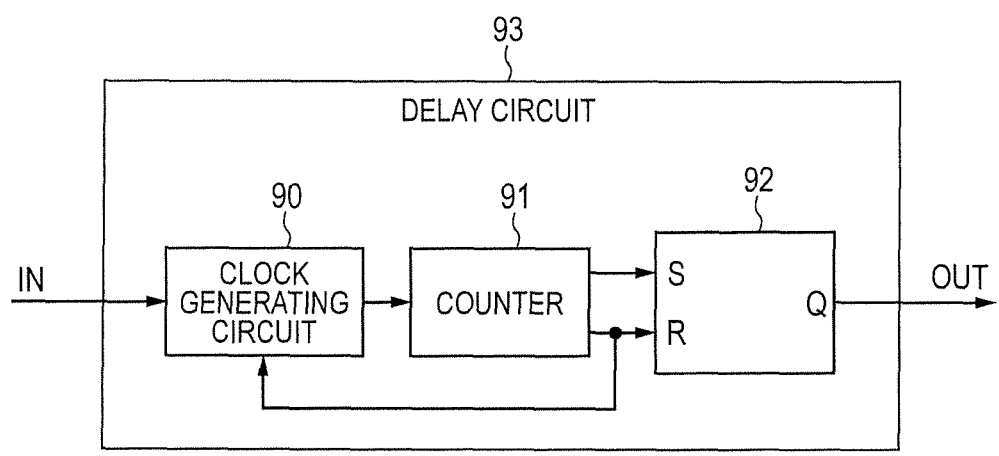
FIG. 11 is a block diagram illustrating yet another delay circuit configuration that is applied to the short time delay circuit and the long time delay circuit.

FIG. 11 illustrates yet another delay circuit configuration that is applied to the short time delay circuit 40 and the long time delay circuit 41. A delay circuit 93 depicted in FIG. 11 is comprised of a clock generating circuit 90 which generates a clock signal in synchronization with a rising edge of an input signal IN, a counter 91 which counts the clock signal pulses, and a flip-flop 92. The clock generating circuit 90 couples a least significant bit of a count value to a SET terminal of the flip-flop 92 and its most significant bit to a RESET terminal of the flip-flop 92. Output from an output terminal Q of the flip-flop 92 is an output OUT of the delay circuit 93. The clock generating circuit 90 stops the counting operation in response to change of the most significant bit of the counter 91 to a logical value of 1. Therefore, the clock generating circuit 90 is not affected by an unwanted level change of an input IN, even if occurring during the clock generating operation. The delay time length is set depending on the frequency of a clock signal generated by the clock generating circuit 90 or may also be set depending on the number of flip-flop stages of the counter 91.

Figure 12:
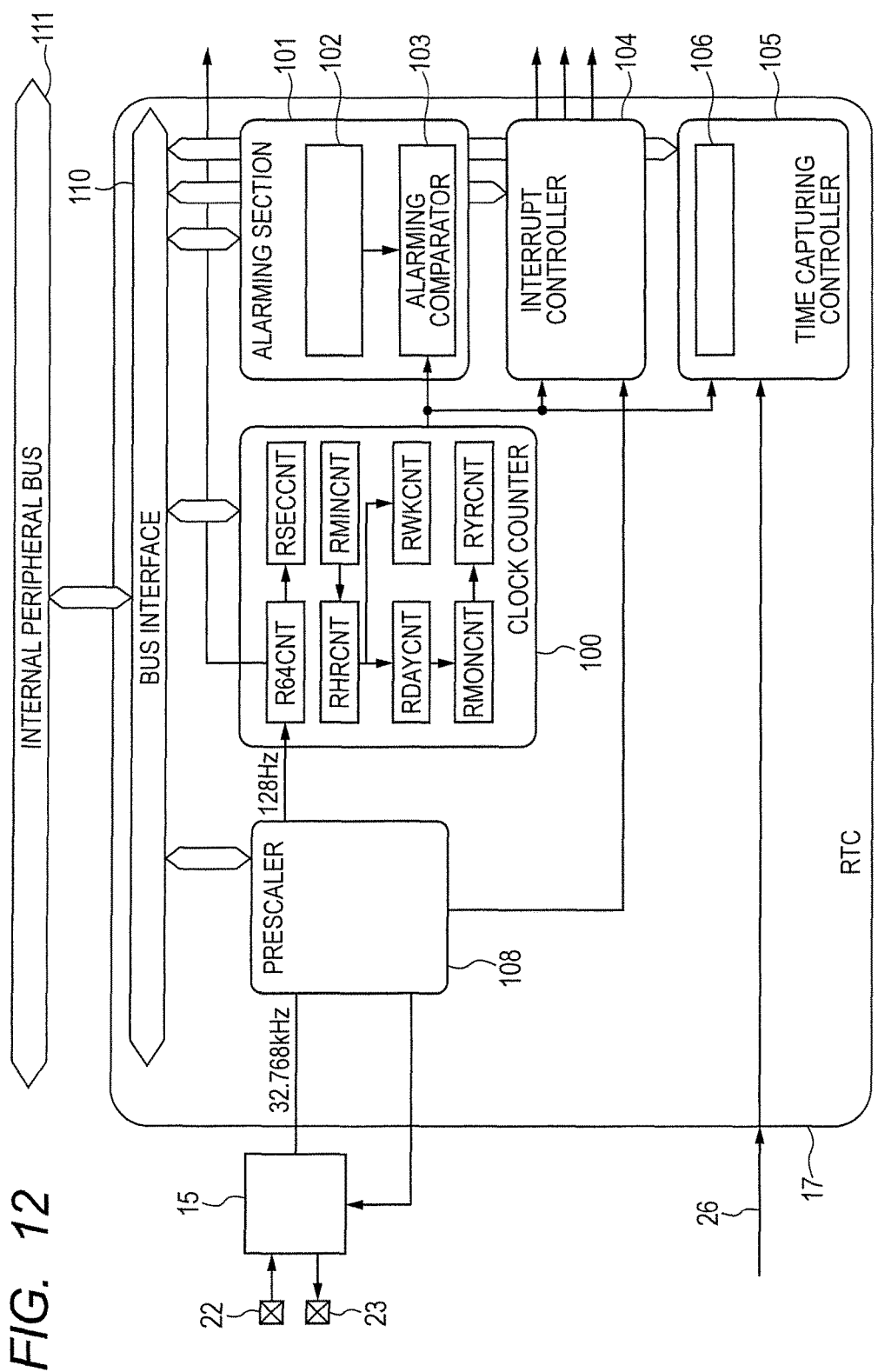
FIG. 12 is a block diagram depicting an example of an RTC.

FIG. 12 depicts an example of the RTC. The RTC 17 includes a prescaler 108, a clock counter 100, an alarming section 101, an interrupt controller 104, and a capturing controller 105. The prescaler 108 generates a 128-Hz clock from a clock signal which is output by the oscillation circuit 15.

In the clock counter 100, a counter R64CNT generates a second period based on the clock, a counter RSECCNT counts seconds based on the second period, a counter RMINCNT receives an output of the counter RSECCNT and counts minutes, and a counter RHRCNT receives an output of the counter RMINCNT and counts hours. An output of the counter RHRCNT is input to counters RDAYCNT and RWKCNT which count days and weeks respectively. A counter RMONCNT receives an output of the counter RDAYCNT and counts months and a counter RYRCNT receives an output of the counter RMONCNT and counts years.

The alarming section 101 determines whether or not there is a match between the time instant and interval counted by the time counter 100 and the time interval and instant which have been set in an alarming register 102 through comparison by an alarming comparator 103 and outputs a matching decision result to the interrupt controller 104. According to the matching decision result, the interrupt controller 104 outputs an interrupt signal 109. The time capturing controller 105 controls an input capturing action that is storing the time counted by the time counter 100 into the storage circuit 16 or the like via a bus interface 110 and an internal peripheral bus 11, when an external event 26 or any other given event is input through an event input terminal 21, according to setting of an event register 106.

Figure 13:
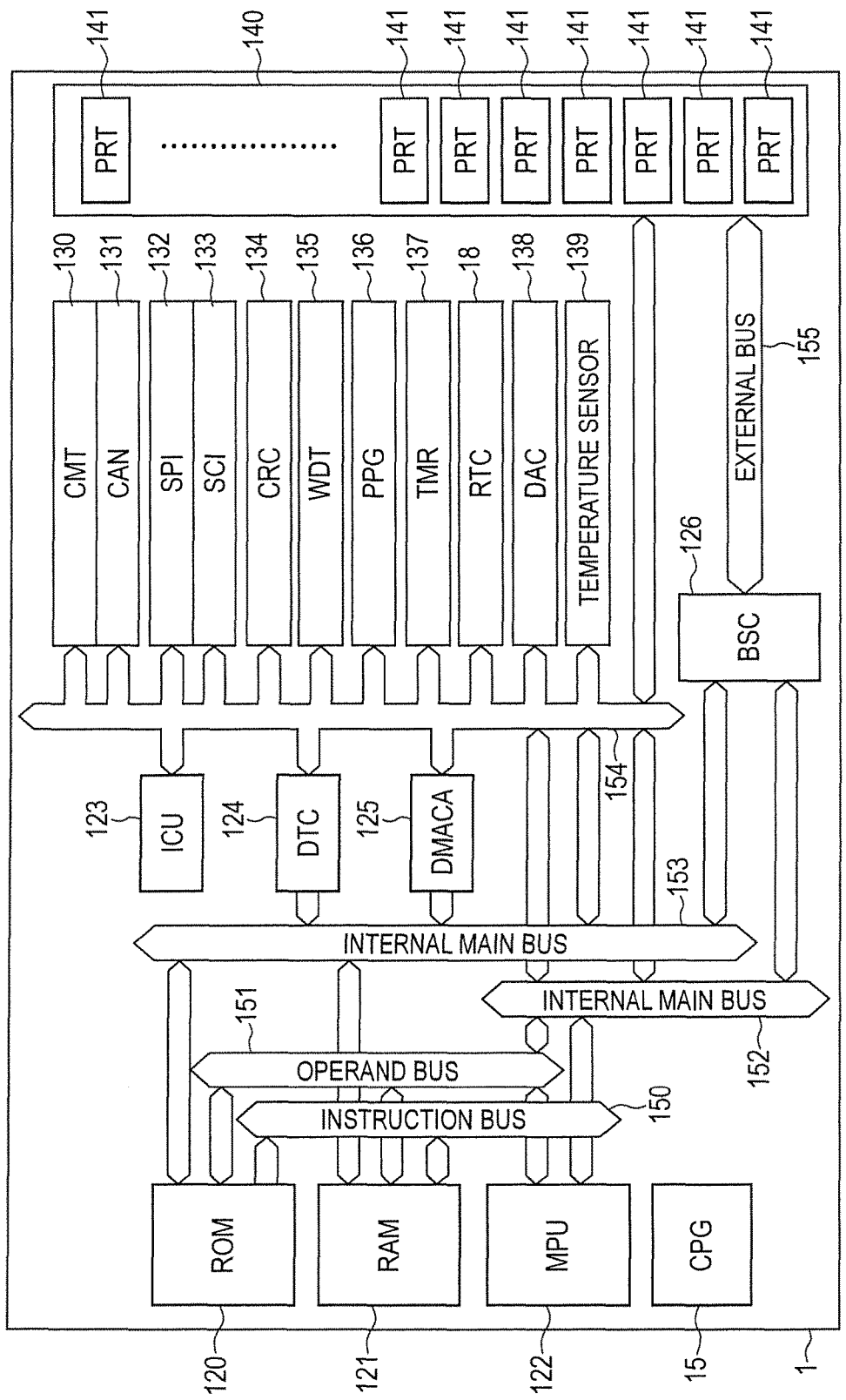
FIG. 13 is a block diagram illustrating a configuration of the semiconductor device implemented as a microcontroller.

FIG. 13 illustrates a configuration of the semiconductor device 1 implemented as a microcontroller. The semiconductor device 1 includes a processor core (MPU) 122 equipped with a central processing unit (CPU), a cache memory, a memory management unit, etc. The processor core 122 performs data processing by executing a program held in a ROM 120 and uses a RAM 121 as a working area for data processing. Instructions configuring a program are transferred via an instruction bus 150 and operands are transferred via an operand bus 151.

The semiconductor device includes MPU 122 peripheral circuits as follows: an interrupt controller (ICU) 123, a data transfer controller (DTC) 124, a direct memory access controller (DMAC) 125, a bus state controller (BSC) 126, a compare match timer (CMT) 130, a control area network module (CAN) 131, a serial peripheral interface controller (SPI) 132, a serial communication interface controller (SCI) 133, cyclic redundancy check operator (CRC) 134, a watchdog timer (WDT) 135, a programmable pulse generator (PPG) 136, a general-purpose timer (TMR) 137, a real-time clock (RTC) 18, a digital-analog converter (DAC) 138, and a temperature sensor 139.

The semiconductor device further includes an input/output port circuit 140 which is interfaced to an external device via the BSC 126 and an external bus 115. The input/output port circuit 140 includes multiple ports (PRT) 141 whose input/output functions are programmably configured.

Figure 14:
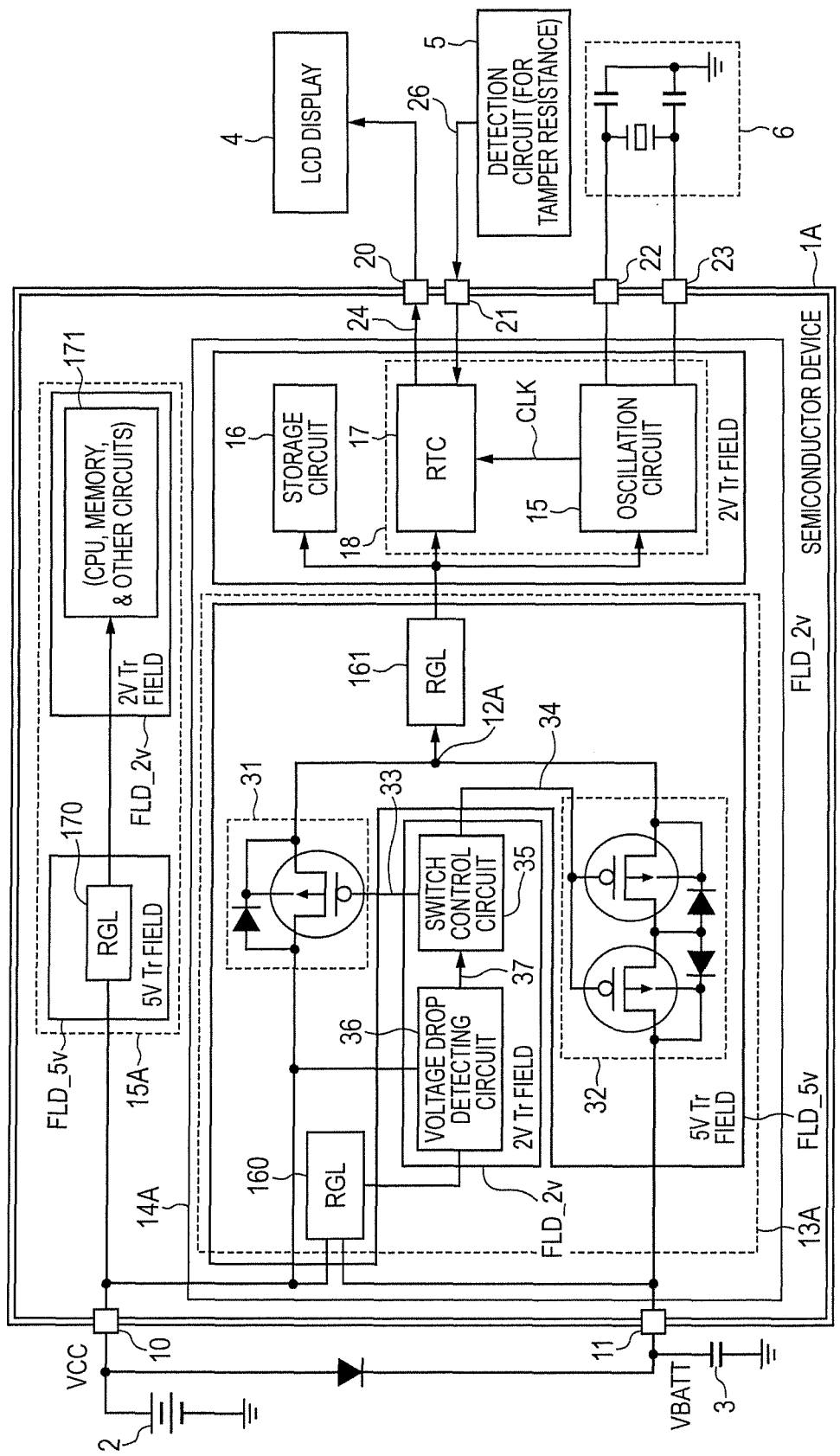
FIG. 14 is a block diagram illustrating an example of the semiconductor device in which noise proofness was enhanced.

FIG. 14 illustrates an example in which noise proofness was enhanced. A semiconductor device 1A depicted in FIG. 14 has separate fields: 5V transistor (5VTr) fields FLD_5v where an operating voltage is 5 V and 2V transistor (2VTr) fields FLD_2v where an operating voltage is 2 V. In the all examples depicted in FIG. 2, the semiconductor device has the 5V Tr fields.

The semiconductor device 1A includes a prescribed internal circuit (first circuit section) 14A that operates on power supplied by coupling one of two types of power supply terminals, a main power supply terminal 10 which is coupled to the main power supply 2 and a backup power supply terminal 11 which is coupled to the backup power supply 3, to an internal power supply node 12. Switching the coupling between the two terminals is made by a switchover circuit 13A. The semiconductor device 1A also includes another circuit section (second circuit section) 15A that operates on power from the main power supply supplied via the main power supply terminal 10.

In the second circuit section 15A, a circuit 171 that includes a Central Processing Unit (CPU) which executes instructions, a memory which is used for a working area for the CPU, and CPU peripheral circuits such as input/output ports is formed in a 2VTr field FLD_2v. This field FLD_2v is supplied, as operating power, with an output of a regulator (RGL) 170 which lowers the main power supply supplied via the main power supply terminal 10 from 5 V to 2 V.

In the first circuit section 14A, the storage circuit 16, RTC 17, and oscillation circuit 15 mentioned previously are formed in a 2VTr field FLD_2v. This field FLD_2v is supplied, as operating power, with an output of a regulator (RGL) 161 which lowers the 5 V power supply from the internal node 12 to 2 V.

The switchover circuit 13A includes a 2VTr field FLD_2v where the voltage drop detecting circuit 36 and the switch control circuit 35 are formed and 5VTr fields FLD_5v where other circuits are formed. In the 5VTr fields FLD_5v, regulators 160, 161 in addition to the MOS switch circuits 31, 32 are formed. A regulator 161 is as described above. A regulator 160 lowers the 5 V main power supply supplied via the main power supply terminal 10 and the 5 V backup power supply supplied via the backup power supply terminal 11, generates a 2 V power supply lowered, and supplies the 2 V power supply to the voltage drop detecting circuit 36 and the switch control circuit 35 as operating power. Although not depicted, the regulator 160 includes a first regulator section which lowers the 5 V main power supply supplied via the main power supply terminal 10 and a second regulator section which lowers the 5 V backup power supply supplied via the backup power supply terminal 11 and the outputs of the respective regulator sections are given in common via a diode to the voltage drop detecting circuit 36 and the switch control circuit 35.

Because, in this way, the voltage drop detecting circuit 36 and the switch control circuit 35 are supplied with operating power via the voltage regulator 160, noise proofness is enhanced in comparison with the semiconductor device depicted in FIG. 2. Similarly, because the storage circuit 16, RTC 17, and the oscillation circuit 15 are supplied with the voltage at the internal power supply node 12 lowered via the regulator 161. Also in this respect, noise proofness of the storage circuit 16, RTC 17, and the oscillation circuit 15 is enhanced.

Figure 15:
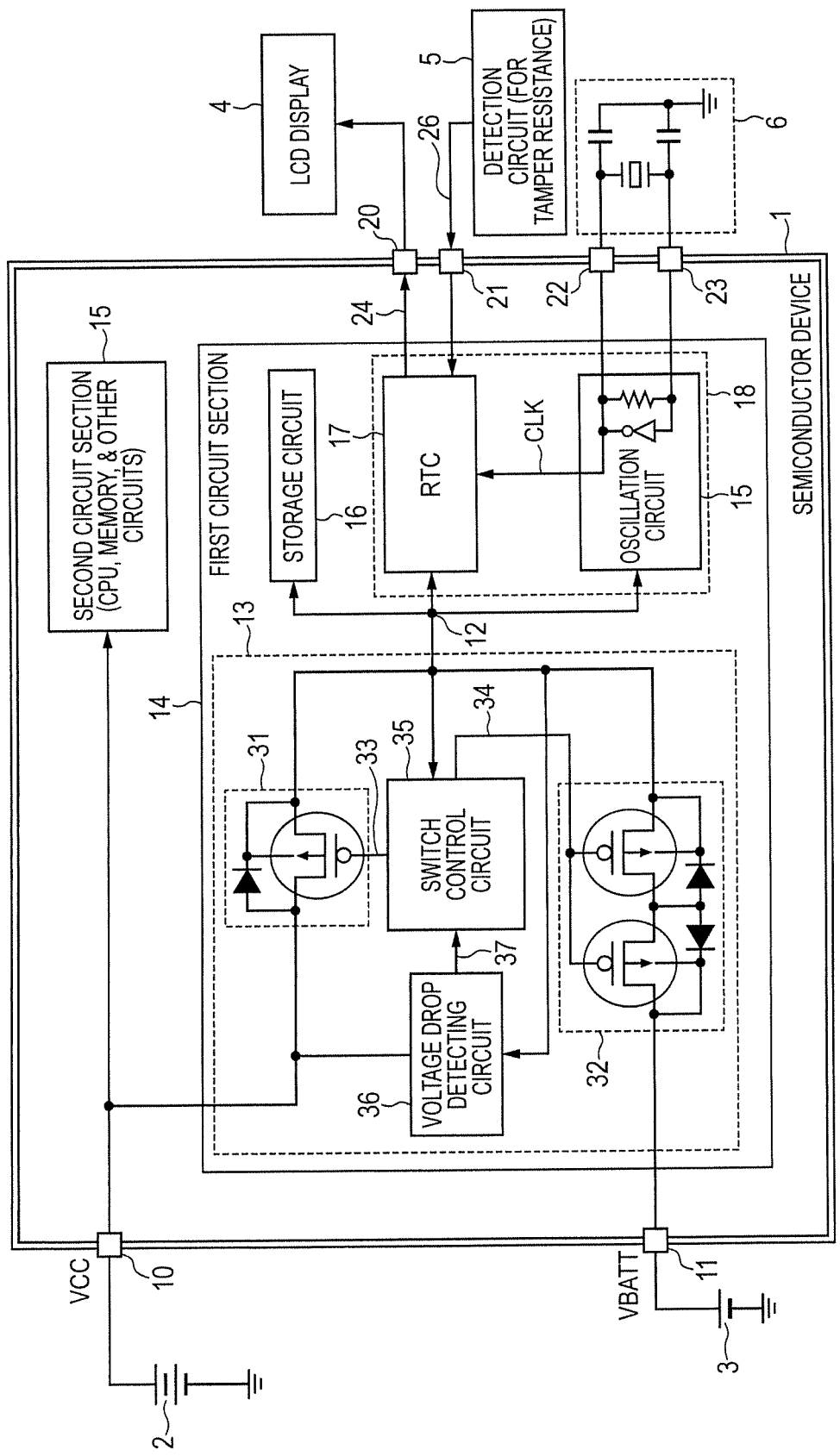
FIG. 15 illustrates an example of a case where a coin-type lithium battery (button battery) is coupled to the backup power supply.

FIG. 15 illustrates an example of a case where a coin-type lithium battery (button battery) is coupled to the backup power supply 3. The semiconductor device 1 can be assumed to be exactly the same as depicted in FIG. 2. Charging which is required for a dual-layer electric capacitor is not required in this case and, therefore, it is not necessary to couple the main power supply terminal 10 to the backup power supply terminal 11 via a diode. Influence of noise on the semiconductor device lessens in comparison with the case in which a dual-layer electric capacitor is used. However, there still remains a risk that power supply interrupts when the semiconductor device is operating powered by the backup power supply.

While the invention made by the present inventors has been described specifically based on its embodiments hereinbefore, it will be obvious that the present invention is not limited to the described embodiments and various modifications may be made thereto without departing from the scope of the invention.

For example, the first circuit section includes the clock circuit to which no limitation is intended and which, instead, may be a volatile memory or any circuit that has a risk of malfunctioning due to unwanted power supply interruption.

The semiconductor device is not limited to a microcontroller and the invention can be applied to diverse semiconductor devices. The semiconductor device may be of a chip or pellet form and may be a device in which a single chip is packaged and a module in which multiple chips are mounted.

Needless to say, a semiconductor device according to an aspect of the invention may have multiple main power supply terminals and multiple backup power supply terminals. Delay circuit configurations are not limited to those described hereinbefore and can be modified appropriately.

What is claimed is:

1. A semiconductor device comprising:
   an internal circuit that operates on power supplied by coupling one of two types of power supply terminals, a main power supply terminal which is coupled to a main power supply and a backup power supply terminal which is coupled to a backup power supply, to an internal power supply node,
   wherein the internal circuit comprises a switchover circuit comprising a first MOS switch circuit placed between the main power supply terminal and the internal power supply node and a second MOS switch circuit placed between the backup power supply terminal and the internal power supply node,
   wherein the switchover circuit comprises a switch control circuit that controls switching actions of the first MOS switch circuit and the second MOS switch circuit,
   wherein the switch control circuit performs control to make a response time for turning the first MOS switch circuit from an ON state to an OFF state longer than a response time for turning it from an OFF state to an ON state and make a response time for turning the second MOS switch circuit from an ON state to an OFF state longer than a response time for turning it from an OFF state to an ON state,
   wherein after the second MOS switch circuit changes in the ON state from the OFF state, the first MOS switch circuit changes in the OFF state from the ON state, and the second MOS switch circuit changes in the OFF state from the ON state after the first MOS switch circuit changes in the ON state from the OFF state.

2. The semiconductor device according to claim 1, wherein the switch control circuit operates on power supplied from the internal power supply node.

3. The semiconductor device according to claim 1, wherein the switch control circuit operates on power that is output by a voltage regulator configured to lower the voltage of a power supply which is supplied via the two power supply terminals, the main power supply terminal and the backup power supply terminal.

4. The semiconductor device according to claim 1, wherein the internal circuit comprises a clock circuit operating on power that is assured by a power supply supplied from the internal power supply node.

5. The semiconductor device according to claim 1, wherein the internal circuit comprises a volatile memory operating on power that is assured by a power supply supplied from the internal power supply node.

6. A semiconductor device comprising:
   a internal circuit that operates on power supplied by coupling one of two types of power supply terminals, a main power supply terminal which is coupled to a main power supply and a backup power supply terminal which is coupled to a backup power supply, to an internal power supply node,
   wherein switching the coupling between the two terminals is made by a switchover circuit and, in a process of switching to couple one of the two types of power supply terminals to the internal power supply node, the switchover circuit delays decoupling of a power supply terminal to be decoupled later than coupling of a power supply terminal to be coupled and makes a delay,
   wherein the switchover circuit comprises:
   a comparison circuit which compares a supply voltage supplied to the main power supply terminal with a reference voltage;

a first delay circuit which receives, as an input, an output of the comparison circuit, waits for a first delay time upon the input, and reflects a level change of the input to its output;

a second delay circuit which receives, as an input, an output of the comparison circuit, waits for a second delay time that is longer than the first delay time upon the input, and reflects a level change of the input to its output;

a first logical gate circuit which receives, as an input, an output of the comparison circuit and an output of the first delay circuit and generates a first signal to control coupling/decoupling of the main power supply terminal to/from the internal power supply node; and a second logical gate circuit which receives, as an input, an output of the comparison circuit and an output of the second delay circuit and generates a second signal to control coupling/decoupling of the backup power supply terminal to/from the internal power supply node, wherein the switchover circuit comprises:

a first MOS switch circuit which is placed between the main power supply terminal and the internal power supply node and ON/OFF controlled by the first signal; and a second MOS switch circuit which is placed between the backup power supply terminal and the internal power supply node and ON/OFF controlled by the second signal, wherein a response time for turning the first MOS switch circuit from an ON state to an OFF state circuit is made longer than a response time for turning it from an OFF state to an ON state and a response time for turning the second MOS switch circuit from an ON state to an OFF state is made longer than a response time for turning it from an OFF state to an ON state, wherein after the second MOS switch circuit changes in the ON state from the OFF state, the first MOS switch circuit changes in the OFF state from the ON state, and the second MOS switch circuit changes in the OFF state from the ON state after the first MOS switch circuit changes in the ON state from the OFF state.

* * * * *